US008208187B2

(12) United States Patent
Tsuchiya

(10) Patent No.: US 8,208,187 B2
(45) Date of Patent: Jun. 26, 2012

(54) OPTICAL SCANNING DEVICE AND IMAGE FORMING APPARATUS

(75) Inventor: Satoshi Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 12/396,602

(22) Filed: Mar. 3, 2009

(65) Prior Publication Data

US 2009/0231655 A1 Sep. 17, 2009

(30) Foreign Application Priority Data

Mar. 13, 2008 (JP) ................................. 2008-064794

(51) Int. Cl.
G02B 26/08 (2006.01)
G02B 26/10 (2006.01)
G02B 26/12 (2006.01)
(52) U.S. Cl. ................................. 359/201.1; 359/204.1
(58) Field of Classification Search ............... 359/204.1, 359/216.1, 201.1, 204.4, 205.1, 206.1, 207.1; 347/258, 347
See application file for complete search history.

(56) References Cited

U.S. PATENT DOCUMENTS

| 2003/0090563 A1* | 5/2003 | Tomita et al. | 347/245 |
|---|---|---|---|
| 2003/0218802 A1* | 11/2003 | Kitabayashi | 359/495 |
| 2004/0184127 A1* | 9/2004 | Nakajima et al. | 359/204 |
| 2006/0232659 A1* | 10/2006 | Hayashi et al. | 347/243 |
| 2008/0130078 A1* | 6/2008 | Okuwaki et al. | 359/204 |
| 2008/0192319 A1* | 8/2008 | Miyatake et al. | 359/204 |

FOREIGN PATENT DOCUMENTS

| JP | 9-54263 | 2/1997 |
|---|---|---|
| JP | 10-73778 | 3/1998 |
| JP | 11-14932 | 1/1999 |
| JP | 11-38348 | 2/1999 |
| JP | 2001-4948 | 1/2001 |
| JP | 2001-10107 | 1/2001 |
| JP | 2001-33720 | 2/2001 |
| JP | 3327760 | 7/2002 |
| JP | 2003-5114 | 1/2003 |
| JP | 3513373 | 1/2004 |
| JP | 2004-70109 | 3/2004 |
| JP | 2004-271906 | 9/2004 |
| JP | 2004-287294 | 10/2004 |
| JP | 2006-154508 | 6/2006 |
| JP | 2006154508 A * | 6/2006 |
| JP | 2006-284822 | 10/2006 |
| JP | 2007-171626 | 7/2007 |
| JP | 2007-241110 | 9/2007 |
| JP | 2008-262125 | 10/2008 |

* cited by examiner

Primary Examiner — Stephone Allen
Assistant Examiner — Kimberly N Kakalec
(74) Attorney, Agent, or Firm — Dickstein Shapiro LLP

(57) ABSTRACT

An optical scanning device includes a plurality of converging lenses and a plurality of supporting members. Each supporting member supports a corresponding one of the converging lenses. Moreover, the converging lenses are arranged so as to be out of alignment with one another in a main-scanning direction and are arranged in a row in a sub-scanning direction in such a manner that no converging lens interferes with supporting members that support other converging lenses.

7 Claims, 12 Drawing Sheets

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-064794 filed in Japan on Mar. 13, 2008.

BACKGROUND OF THE INVENTION

1. Field of the Invention

The present invention relates to an optical scanning device for use in digital copying machines, laser printers, or laser facsimile machines and image forming apparatuses.

2. Description of the Related Art

Optical scanning devices are incorporated in laser printers. A typical optical scanning device is configured so that a light beam emitted from a light source device is deflected by an optical deflector, and the deflected light beam is converged onto a scanning surface by a scanning and image optical system, such as an Fθ lens, in the form of a beam spot. The scanning surface is then optically scanned with the beam spot (this scanning process is called "main scanning"). The scanning surface is typically photosensitive surface of a photosensitive member.

A full-color image forming apparatus typically includes four photosensitive members, a plurality of light source devices, one deflecting device, and four optical systems. The four photosensitive members are arranged along the conveyance direction of a printing paper. Light flux of light beams that are emitted from the light source devices are deflected at the deflecting device and directed on the photosensitive members at the optical systems thereby forming beam spots on the photosensitive members. The photosensitive members are then scanned with these beam spots thereby forming latent images on the photosensitive members. The latent images are then developed into visible images at developing devices that use developers in mutually different colors, namely in yellow, magenta, cyan, and black, for example. Subsequently, the visible images are sequentially transferred and fixed onto one printing paper on top of one another, so that a color image is obtained.

An image forming apparatus that includes two or more photosensitive members that are arranged along the conveyance direction of a printing paper is known as a tandem-type image forming apparatus. In the tandem-type image forming apparatuses, a single optical deflector is used in common among all the photosensitive members.

For instance, Japanese Patent Application Laid-open No. H9-54263 discloses a technique by which a plurality of light fluxes that are substantially parallel to one another and are apart from one another in a sub-scanning direction are made incident to an optical deflector, whereas a plurality of scanning optical devices that correspond to the light fluxes are arranged in the sub-scanning direction so that a scanning process is performed. Further, Japanese Patent Application Laid-open No. 2001-4948, Japanese Patent Application Laid-open No. 2001-10107, and Japanese Patent Application Laid-open No. 2001-33720 each disclose a technique by which light fluxes are made incident to an optical deflector from one side of the optical deflector, while scanning optical systems that are configured so as to be in three layers are used. A plurality of light fluxes that travel toward mutually different scanning surfaces pass through a first and a second scanning optical system layers, whereas a third scanning optical system layer is provided for each of the mutually different scanning surfaces. By employing a single optical deflector in common among the plurality of scanning surfaces, it is possible to reduce the number of components and to make the image forming apparatus compact.

A polygon mirror is typically used as the optical deflector. If a single polygon mirror is used corresponding to a plurality of photosensitive members, although it is possible to reduce the number of components, there is a drawback that the polygon mirror needs to be made larger in the sub-scanning direction. This is because, it is necessary to cause the light beams deflected at the optical deflector to be incident onto the photosensitive members are arranged in a row in the sub-scanning direction and substantially parallel to each other. Polygon mirror, in general, and larger polygon mirrors, in particular, are expensive.

Japanese Patent Application Laid-open No. 2003-5114 discloses, as an attempt to reduce the costs, an oblique incident optical system with which a light beam is made incident onto the deflecting reflection surface of a single optical deflector at an angle in the sub-scanning direction. In the oblique incident optical system, after being deflected and reflected on the deflecting reflection surface, each of a plurality of light beams that have been separated by a turn-back mirror or the like is introduced to a corresponding one of photosensitive members serving as scanning surfaces. In this configuration, the angle, in the sub-scanning direction, of each of the light beams (i.e., the angle at which each of the light beams is obliquely incident to the optical deflector) is set at such an angle that the light fluxes can be separated by the mirror. With the oblique incident optical system it is possible to keep the distance small between the light beams that are positioned adjacent to one another in the sub-scanning direction, while the mirror is able to separate the light fluxes from one another, without having to use a large optical deflector (i.e., without having to configure a polygon mirror so as to have too many layers or to be too thick in the sub-scanning direction).

However, the oblique incident optical system has the problem of having a large bending of a scanning line. The amount of occurrence of the bending of the scanning line varies depending on the oblique incident angle, in the sub-scanning direction, of each of the light beams. If a bending of a scanning line occurs, when latent images that have been drawn by the light beams are made visible and are overlapped on top of one another by using toners for different colors, the images will exhibit a color registration error. Also, in the oblique incident optical system, because the light flux is incident while being distorted with respect to a scanning lens, the wave aberration increases, and the level of optical performance is significantly degraded especially for the periphery image height. Thus, the beam spot size becomes large, and it could be one of the causes that hinder the endeavor to make high quality images.

Some methods have been proposed to correct the large bending of a scanning line, which is a problem peculiar to the oblique incident optical system described above. As an example, Japanese Patent Application Laid-open No. H11-14932 discloses a method by which a scanning and image forming optical system is configured so as to include a lens that has a lens surface of which the unique inclination in the sub-scanning cross-sectioned plane is altered toward the main-scanning direction, so that the bending of the scanning line can be corrected. As another example, Japanese Patent Application Laid-open No. H11-38348 discloses a method by which a scanning and image forming optical system is configured so as to include a correcting reflection surface that has a reflection surface of which the unique inclination in the sub-scanning cross-sectioned plane is altered toward the main-scanning direction, so that the bending of the scanning line can be corrected. Further, Japanese Patent Application Laid-open No. 2004-70109 discloses yet another method by which a light flux that is obliquely incident is caused to pass on the outside of the axis of a scanning lens, so that the positions of the scanning lines are brought into alignment by using a surface by which the amount of asphericity of the non-generatrix of the scanning lens changes along the main-scanning direction. Japanese Patent Application Laid-open No. 2004-70109 discloses an example in which a correction process is performed by using one scanning lens. By using this method, it is possible to correct the bending of the scanning line like the one described above; however, this publication does not disclose any technique related to degradation of a beam spot diameter due to an increase in the wave aberration, which is explained below.

As another example, Japanese Patent Application Laid-open No. H10-73778 discloses a technique to realize an optical scanning device that is able to properly correct the bending of the scanning line and degradation of the wave aberration, which are the problems related to the oblique incident method as described above. According to this technique, the scanning and image forming optical system includes a plurality of rotating asymmetric lenses, and the shape of a generatrix that connects the vertices of the non-generatrix on the lens surface of the rotating asymmetric lenses is configured to be curved in the sub-scanning direction. This publication discloses the correcting method based on design values. In actuality, however, the bending of the scanning line and the wave aberration that are corrected at the designing stage are degraded due to a change in the oblique incident angle caused by the influence of assembly errors, process errors, or the like of the optical elements. As a result, a problem still remains where the quality of the image is lowered.

Another problem is that, in the case where the oblique incident angle changes due to the influence of assembly errors, process errors, or the like, the optical elements such as the scanning lens and the turn-back mirror are not able to cause the light beams to pass the positions as designed. Thus, a problem arises where the beam spot size may vary, and moreover, the light beams do not reach the scanning surfaces. This problem may be alleviated by processing and assembling the optical elements with a higher level of precision. However, this solution is not realistic because the costs of the components will greatly increase, and longer time will be required to assemble the optical elements due to the complicated assembly process.

In an oblique incident optical system, when the angle at which the light beam is obliquely incident to a deflecting reflection surface increases, various types of aberrations are degraded, and also the level of optical performance is degraded. More specifically, due to the degradation of the wave aberration, the beam spot diameters are degraded, and the degree of the bending of the scanning line also increases. In view of the level of optical performance and making the optical scanning device compact, it is preferable to make the oblique incident angle as small as possible. However, when the oblique incident angle is small, it becomes difficult to separate the light beams for each of the corresponding scanning surfaces. The reason for this can be explained as follows: To separate the light beams travelling toward the mutually different scanning surfaces while arranging the oblique incident angle to be small, the distance between the light beams in the sub-scanning direction at the position of separation is configured so as to be as small as possible. In this situation, if the oblique incident angle is changed in such a manner that the positions in which the light beams pass change in the sub-scanning direction, the light beams do not pass the positions that they are supposed to pass according to the designs of the optical elements. As a result, the beam spot diameters become large. Consequently, depending on whether the light beams pass the positions as designed or how much the light beams deviate from the positions according to the design, the beam spot diameters fluctuate. Thus, it is not possible to obtain stable beam spot diameters.

Japanese Patent Application Laid-open No. 2004-271906 discloses a light source device including an oblique incident optical system. However, the problem described above, that is, the oblique incident angle is changed due to the influence of assembly errors, process errors, or the like, is not solved. Alternatively, another method may be possible by which, after all the optical elements are assembled together, the coupling lens is adjusted so that the angle in the sub-scanning direction can be adjusted. However, when this method is used, the assembly and the adjustment of the light source device become complicated. Thus, this method is not very desirable because it leads to another problem where the time required to make the adjustments increases.

SUMMARY OF THE INVENTION

It is an object of the present invention to at least partially solve the problems in the conventional technology.

According to an aspect of the present invention, there is provided an optical scanning device including a plurality of converging lenses that converge, at least in a sub-scanning direction, a plurality of light beams that have been emitted from a plurality of light sources so as to be substantially parallel to one another; a plurality of supporting members, each of the supporting members supports a corresponding one of the converging lenses; an optical deflector that deflects the light beams in a main-scanning direction; and a housing that supports the supporting members, the optical scanning device being configured so as to cause the light beams that are positioned apart from one another in the sub-scanning direction to be incident onto the optical deflector. The converging lenses are arranged so as to be out of alignment with one another in the main-scanning direction and are arranged in a row in the sub-scanning direction in such a manner that no converging lens interferes with supporting members that support other converging lenses.

According to another aspect of the present invention, there is provided an image forming apparatus including an optical scanning device including a plurality of converging lenses that converge, at least in a sub-scanning direction, a plurality of light beams that have been emitted from a plurality of light sources so as to be substantially parallel to one another; a plurality of supporting members, each of the supporting members supports a corresponding one of the converging lenses; an optical deflector that deflects the light beams in a main-scanning direction; and a housing that supports the supporting members, the optical scanning device being configured so as to cause the light beams that are positioned apart from one another in the sub-scanning direction to be incident onto the optical deflector, wherein the converging lenses are arranged so as to be out of alignment with one another in the main-scanning direction and are arranged in a row in the sub-scanning direction in such a manner that no converging lens interferes with supporting members that support other converging lenses; and a plurality of photosensitive members that receive the light beams deflected from the optical deflector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
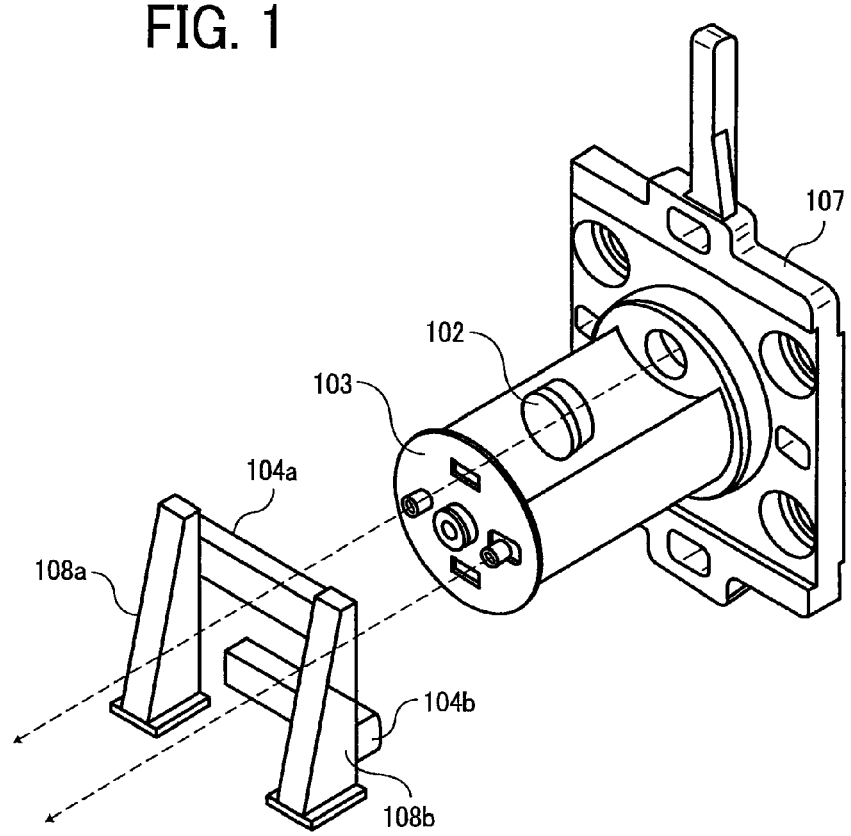
FIG. 1 is a schematic perspective view from the front side of a supporting structure for converging lenses according to a first embodiment of the present invention.
Figure 2:
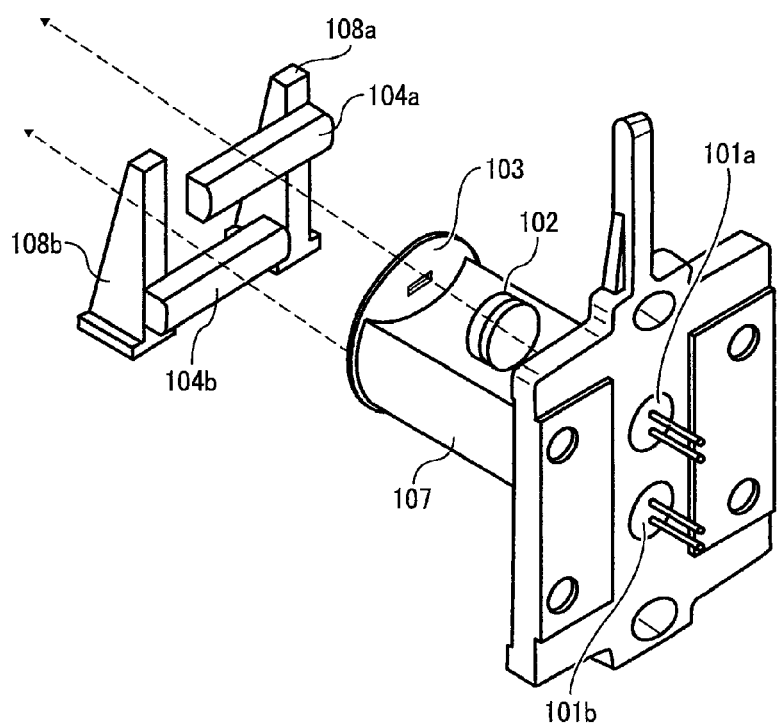
FIG. 2 is a schematic perspective view from the rear side of the supporting structure shown in FIG. 1.
Figure 3:
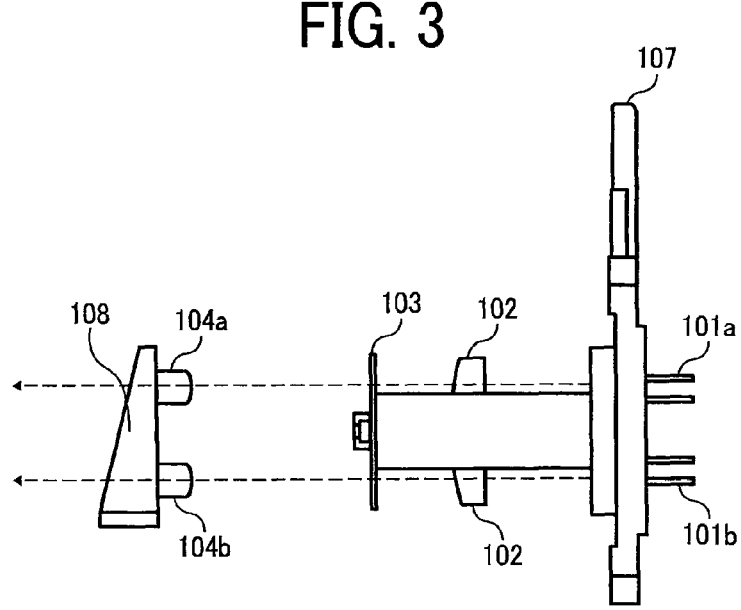
FIG. 3 is a schematic view from a lateral side of the supporting structure shown in FIG. 1.
Figure 4:
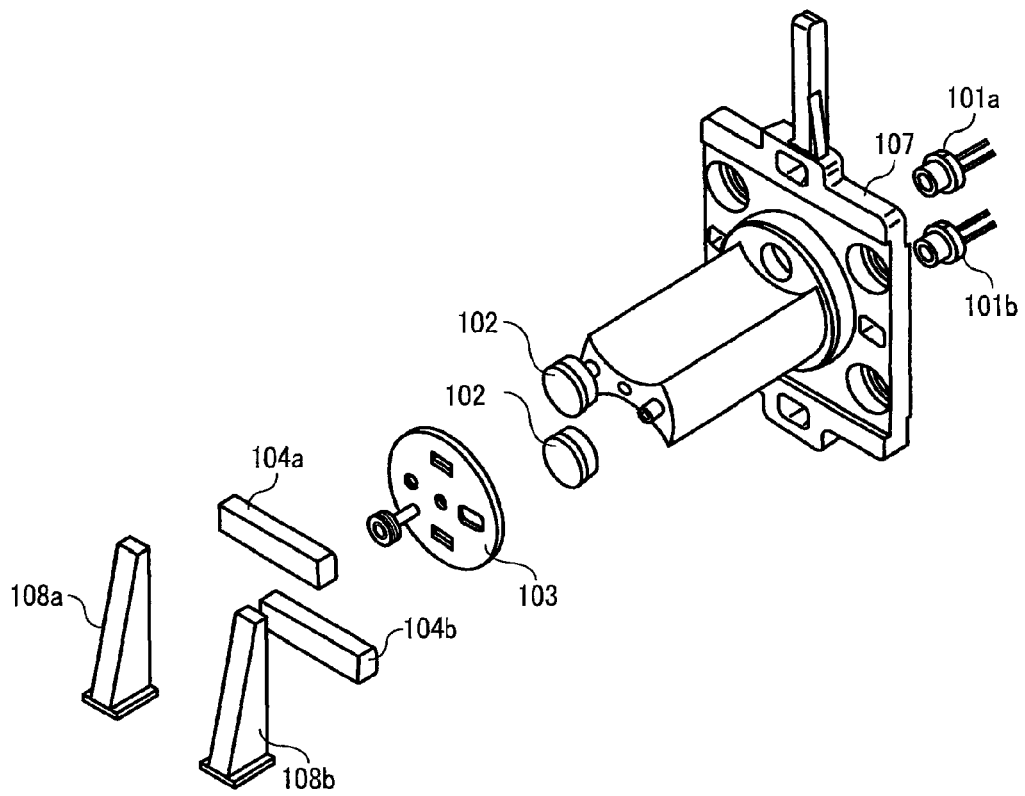
FIG. 4 is a schematic exploded perspective view from the front side of the supporting structure shown in FIG. 1.
Figure 5:
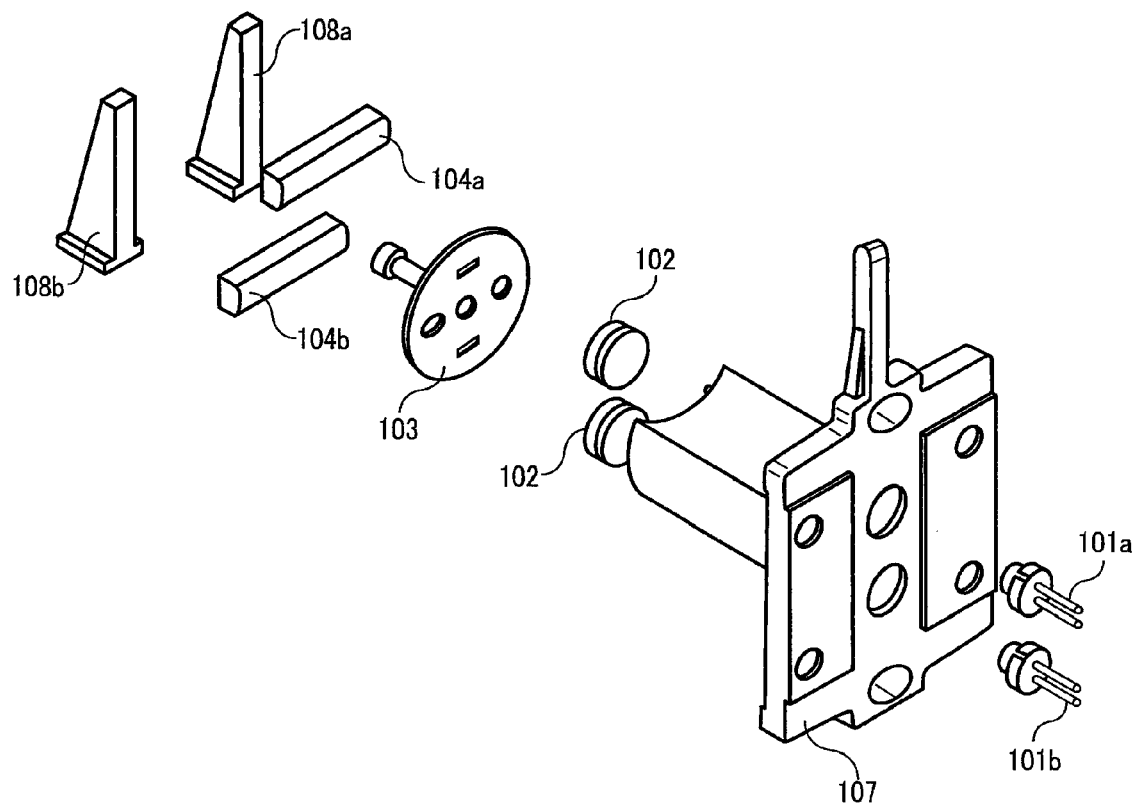
FIG. 5 is a schematic exploded perspective view from the rear side of the supporting structure shown in FIG. 1.

Exemplary embodiments of the present invention will be explained below in detail with reference to the accompanying drawings.

FIGS. 1 to 5 are schematic perspective views of a supporting structure for converging lenses according to a first embodiment of the present invention. In this supporting structure, light sources 101a and 101b are held by a light source holding member 107. A coupling lens 102 and an aperture plate 103 are integrally attached to the light source holding member 107. A converging lens 104a is fixed and supported by a supporting member 108a and a converging lens 104b is fixed and supported by a supporting member 108b. Light beams that are emitted from the light sources 101a and 101b pass through the coupling lens 102 and the aperture plate 103 before falling on converging lenses 104a and 104b.

Figure 6:
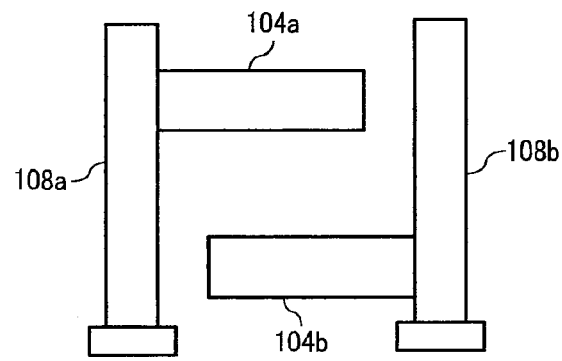
FIG. 6 is a schematic drawing for explaining how the converging lenses shown in FIGS. 1 to 5 are supported.
Figure 7:
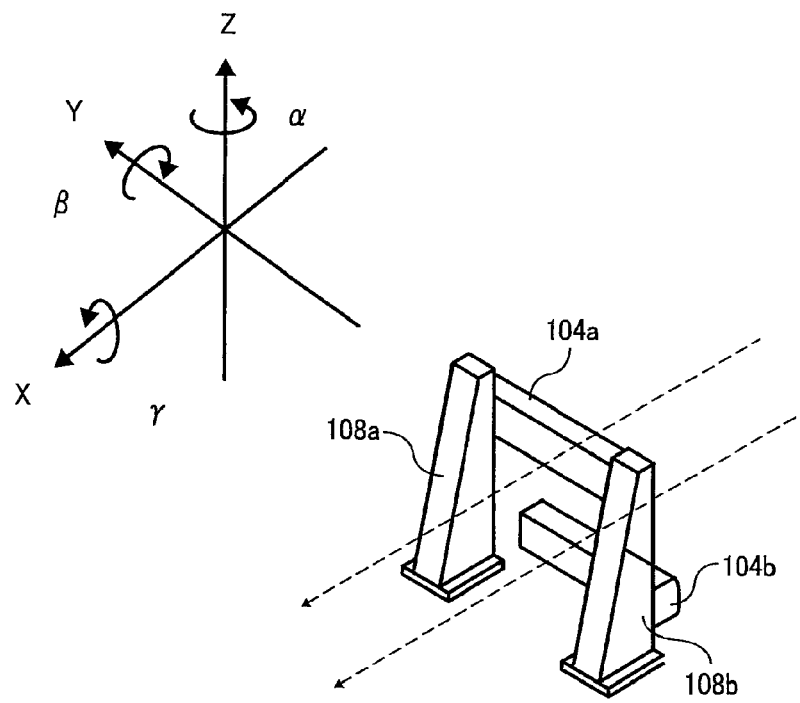
FIG. 7 is a schematic drawing for explaining adjustment of the converging lenses shown in FIGS. 1 to 5.
Figure 8:
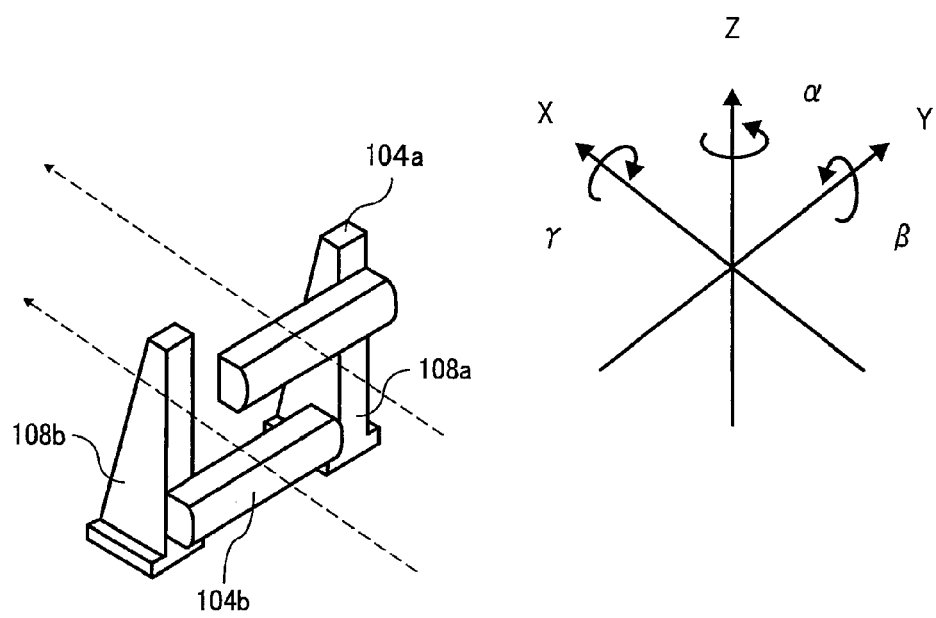
FIG. 8 is another schematic drawing for explaining adjustment of the converging lenses shown in FIGS. 1 to 5.

As shown in FIGS. 6 to 8, the converging lenses 104a and 104b are displaced from each other in the Y direction that is the main-scanning direction, while the converging lenses 104a and 104b are arranged in a row in the Z direction that is the sub-scanning direction. Each of the supporting members 108a and 108b has a bottom face that is formed so as to extend parallel to the optical axis and a lateral face that is formed so as to extend orthogonally to the optical axis. Each of the supporting members 108a and 108b supports, on the lateral face thereof, the corresponding one of the converging lenses 104a and 104b. The bottom face of each of the supporting members 108a and 108b is fixed onto a housing (not shown). It is possible to adjust the fixing positions of the supporting members 108a and 108b in the optical axis direction and in the main-scanning direction on the housing. The converging lenses 104a and 104b are arranged so as to be out of alignment with each other in the main-scanning direction. Thus, the converging lenses 104a and 104b are configured so that, without interfering with the supporting members 108a and 108b, it is possible to adjust the fixing position of each of the converging lenses 104a and 104b in six axial directions (i.e., the X, Y, Z, α, β, and γ directions) that are shown in FIGS. 7 and 8, with respect to the corresponding one of the supporting members 108a and 108b. Each of the converging lenses 104a and 104b is fixed onto the corresponding one of the supporting members 108a and 108b, while being placed in an appropriate position that yields a desired light flux by a special fixture used for adjusting the positions of the converging lenses 104a and 104b, a simulator, or manual adjustments.

As described above, because of a configuration in which the converging lenses 104a and 104b are fixed to the housing (not shown) via the supporting members 108a and 108b, respectively, in appropriate positions that yield the desired light flux, it is possible to achieve a plurality of optical characteristics at the same time, such as the characteristics to prevent the beam waist diameter from becoming large, to reduce the deviation of the position of the beam waist, and to reduce the deviation of the position of the beam spot. In addition, the converging lenses 104a and 104b are configured so that it is possible to adjust the eccentricity thereof in a direction to go around an axial line that is parallel to the optical axis. As a result, it is possible to optimize the distance between the scanning lines in the sub-scanning direction (i.e., the sub-scanning beam pitch).

Further, according to the first embodiment, the positions of the converging lenses 104a and 104b is adjustable in the six axial directions. Thus, it is possible to selectively use or omit any of the adjustment directions as necessary. Thus, it is possible to achieve versatility of the fixing means and the adjusting means. The method used in the first embodiment by which, namely, the converging lenses 104a and 104b are fixed via the supporting members 108a and 108b, respectively, does not necessarily have to be used only for fixing the converging lenses 104a and 104b. It is possible to use this method for fixing other optical elements. By optimizing the material of which the supporting members 108a and 108b are made and the shape of the supporting members 108a and 108b, it is possible to fix the optical elements in a manner that changes little in the course of time. Consequently, it is possible to alleviate degradation of optical characteristics caused by, for example, changes in the temperature.

In the configuration described above, by configuring each of the supporting members 108a and 108b with a plastic material that has optical transparency and can be used in optical elements, it is acceptable to fix the supporting members 108a and 108b onto the housing (not shown) and to fix the converging lenses 104a and 104b respectively onto the supporting members 108a and 108b, by using a light-curing adhesive, after they are placed in arbitrary positions. As a result, it is possible to simplify the fixing process.

Figure 9:
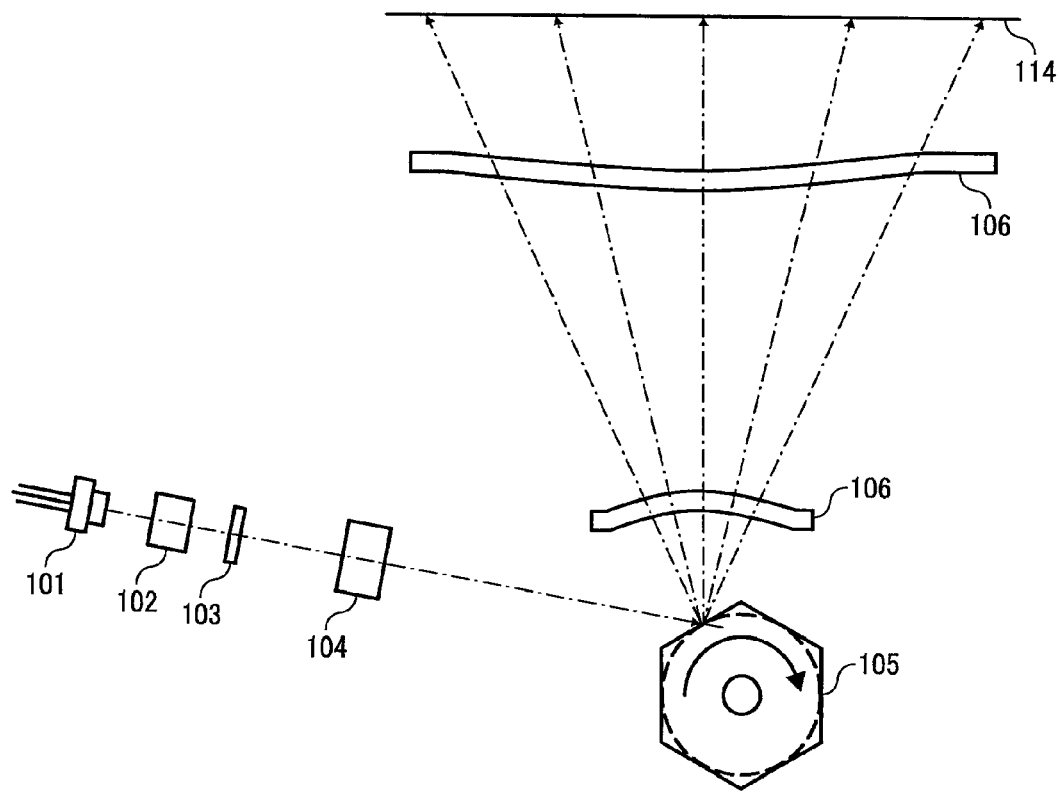
FIG. 9 is a schematic plan view of an optical scanning device that employs the supporting structure shown in FIG. 1.
Figure 10:
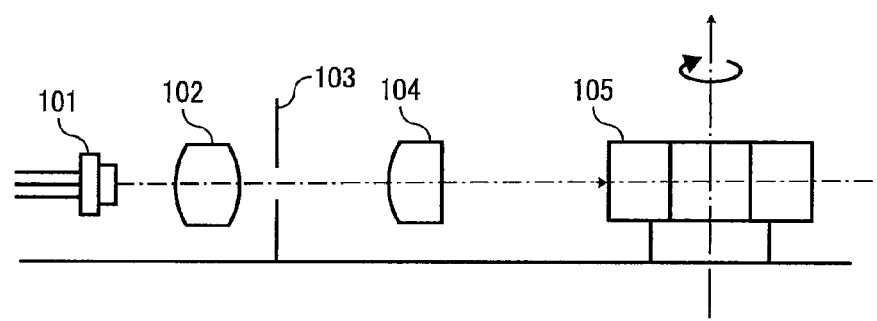
FIG. 10 is a schematic front view of the optical scanning device shown in FIG. 9.
Figure 11:
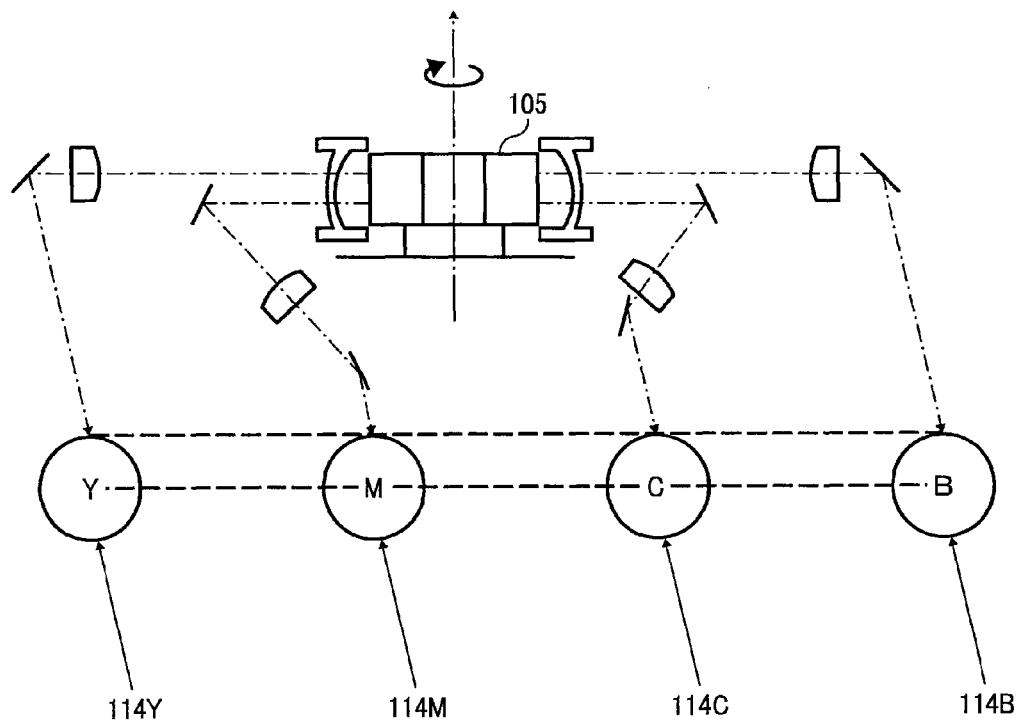
FIG. 11 is a schematic front view of an optical scanning device that employs the supporting structure shown in FIG. 1 and a multi-beam light source.

FIGS. 9 to 11 are each a drawing of an optical scanning device that employs the supporting structure for a converging lens 104 according to the first embodiment. In FIGS. 9 and 10, the light beam emitted from a light source 101 is incident onto a polygon mirror 105 that is an optical deflector, via the coupling lens 102, the aperture plate 103, and the converging lens 104. The light beam that is reflected by the polygon mirror 105 forms an image on a photosensitive member 114 via an image forming optical system 106. When the photosensitive member 114 is made up of four photosensitive members as shown in FIG. 11, it is necessary to cause the light beams travelling toward the photosensitive members 114 to be incident onto the polygon mirror 105 while being arranged in a row in the sub-scanning direction so as to be substantially parallel to one another. Thus, the polygon mirror 105 needs to be made larger in the sub-scanning direction.

Figure 12:
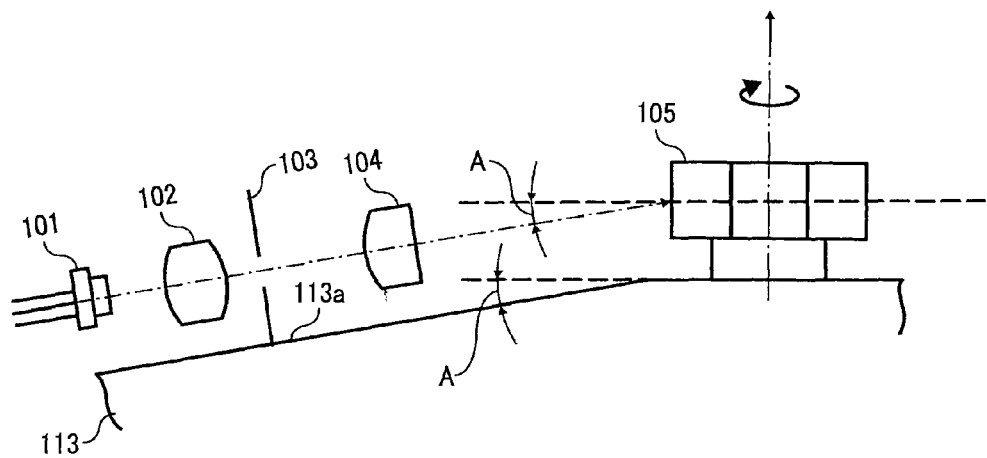
FIG. 12 is a schematic front view of an optical scanning device according to a second embodiment of the present invention.
Figure 13:
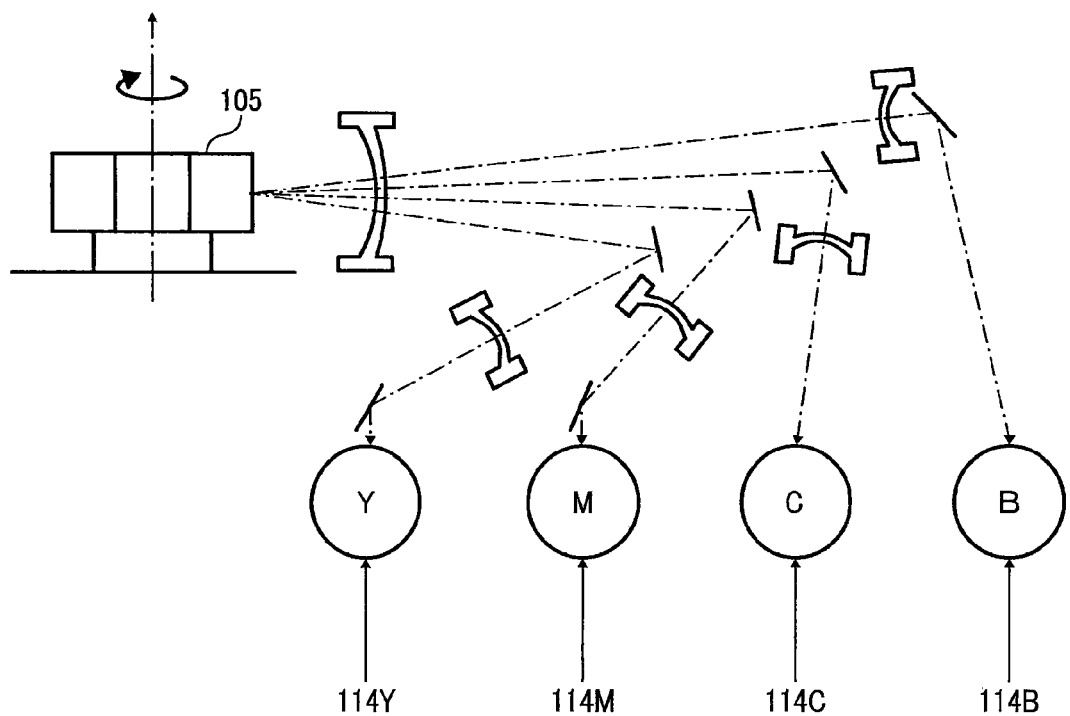
FIG. 13 is a schematic front view of an optical scanning device that employs a multi-beam light source according to the second embodiment of the present invention.

To solve this problem, in a second embodiment of the present invention as shown in FIG. 12, the light source 101, the coupling lens 102, the aperture plate 103, and the converging lens 104 are arranged over a housing 113 that has an oblique incident surface 113a serving as a supporting surface, so that the light beam is incident onto the polygon mirror 105 while being inclined at a predetermined angle A in the sub-scanning direction with respect to the polygon mirror 105. As another example, in the case where two or more light sources 101 are used, and the light beams that have been emitted from the light sources 101 are incident onto the polygon mirror 105 at mutually different angles, as shown in FIG. 13, each of the light beams that are deflected by the polygon mirror 105 is further deflected at an angle that is the same as the angle at which the light beam is incident onto the polygon mirror 105 and forms an image on the corresponding one of the photosensitive members 114 via the image forming optical system 106.

With the configuration described above, each of the light paths extends along a locus that changes in a three-dimensional manner, and it is therefore possible to reduce the number of components such as the turn-back mirror and to reduce the costs. In addition, it is possible to keep the size of the optical scanning device, as a whole, small and to make the device compact. In the oblique incident optical system as described above, because each of the light beams is caused to be incident onto the polygon mirror 105 while being inclined at the predetermined angle in the sub-scanning direction, the posture in the sub-scanning direction on the polygon mirror 105 has a great impact on the performance level of the image forming optical system 106 after the deflection, especially on the bending of the scanning line. However, in the optical scanning device that employs the supporting structure for the converging lens 104 according to the present invention, it is possible to optimize the oblique incident angles. Thus, it is possible to alleviate degradation in the image quality in the scanning optical system and to prevent the light beam diameters from being degraded.

Figure 14:
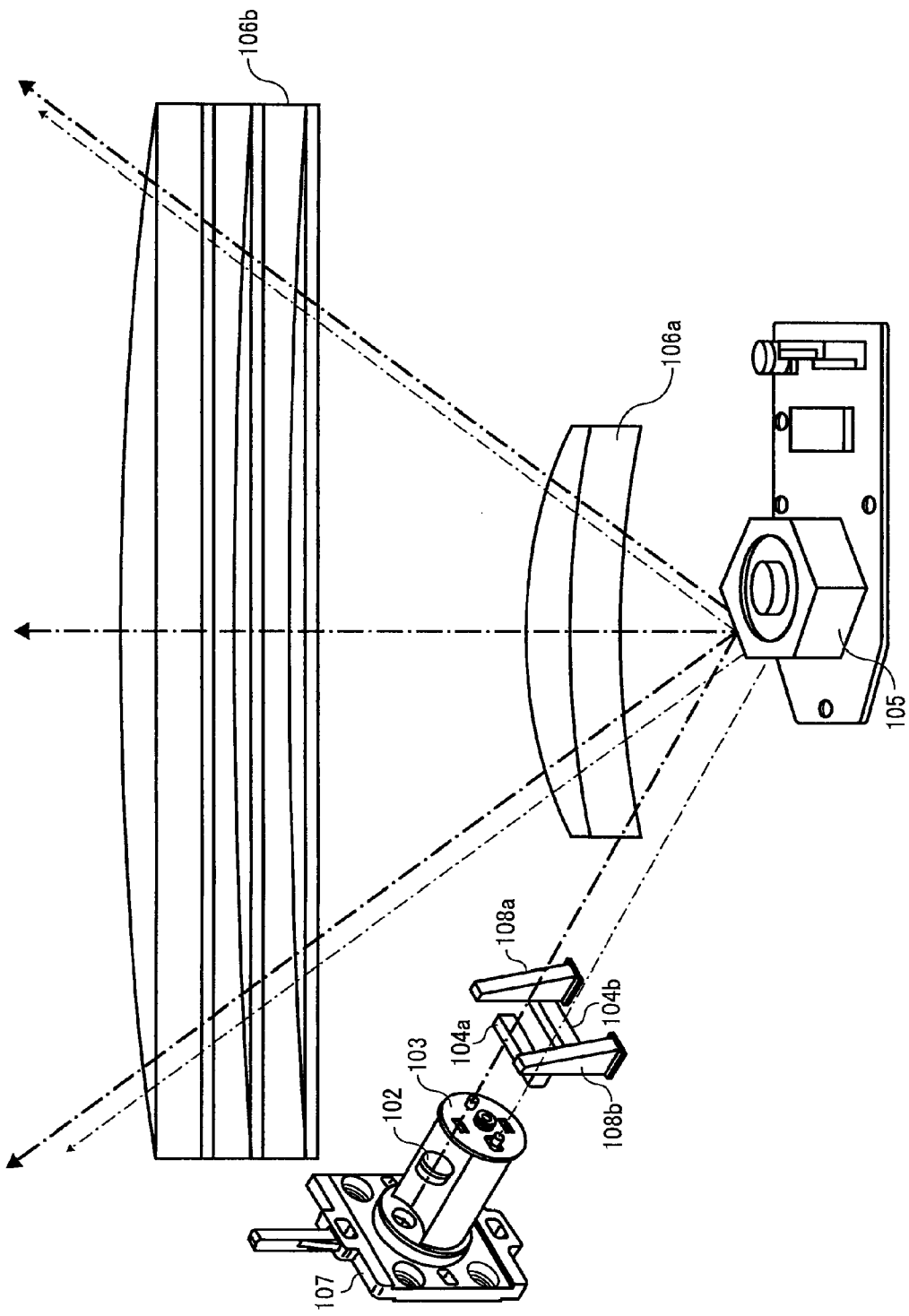
FIG. 14 is a schematic perspective view of an optical scanning device to which the first and the second embodiments of the present invention can be applied.
Figure 15:
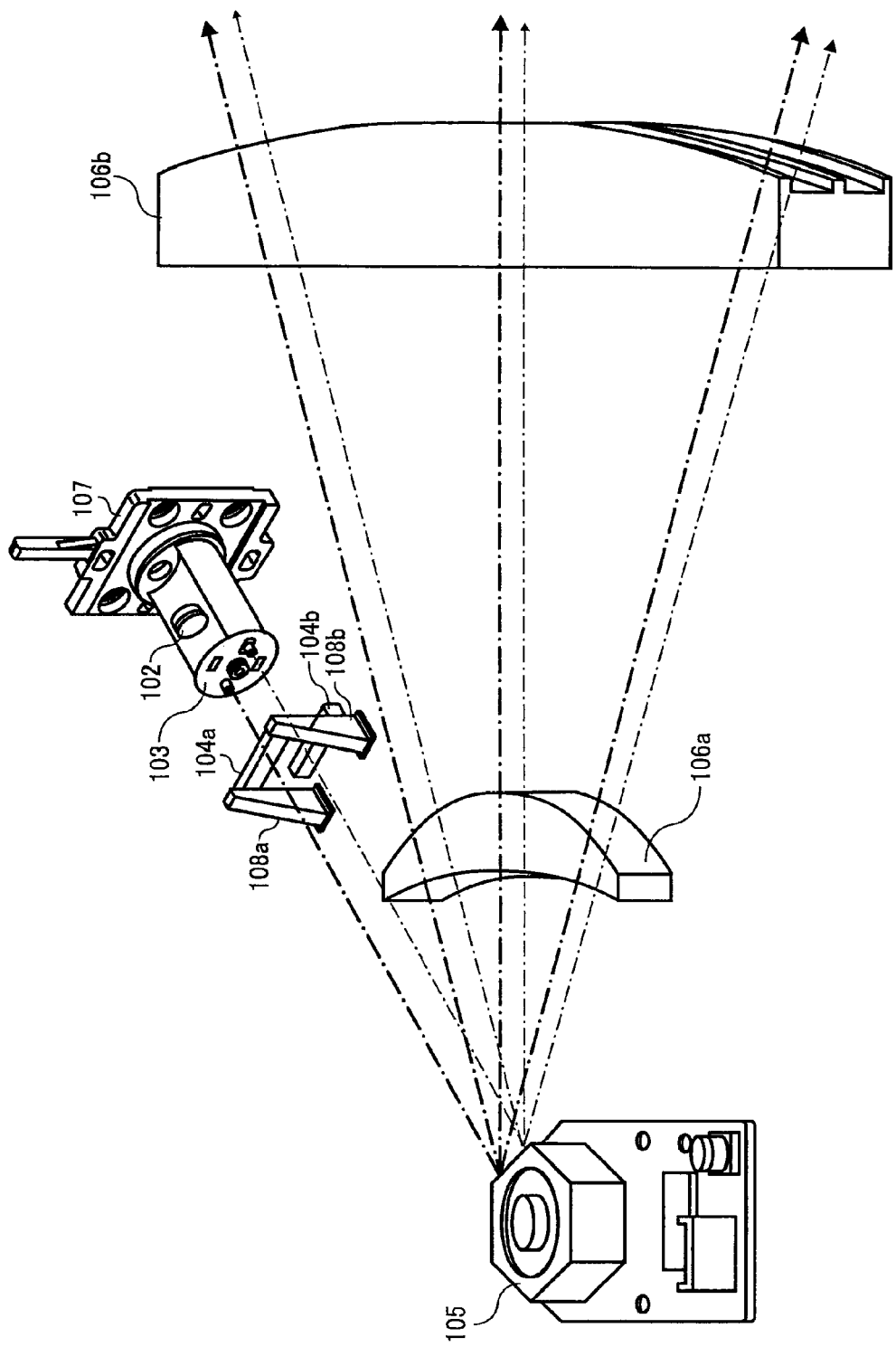
FIG. 15 is another schematic perspective view of the optical scanning device to which the first and the second embodiments of the present invention can be applied.

In the optical scanning device described above, by configuring the light source 101 with, for example, a semiconductor laser array having a plurality of light emission points or a multi-beam light source device including a plurality of light sources each having a single light emission point or a plurality of light emission points, so that the surfaces of the photosensitive members 114 are scanned at the same time by a plurality of light beams, as shown in FIGS. 14 and 15, it is possible to structure an optical scanning device and an image forming apparatus that are compliant with an endeavor to achieve a high speed and a high density.

Figure 16:
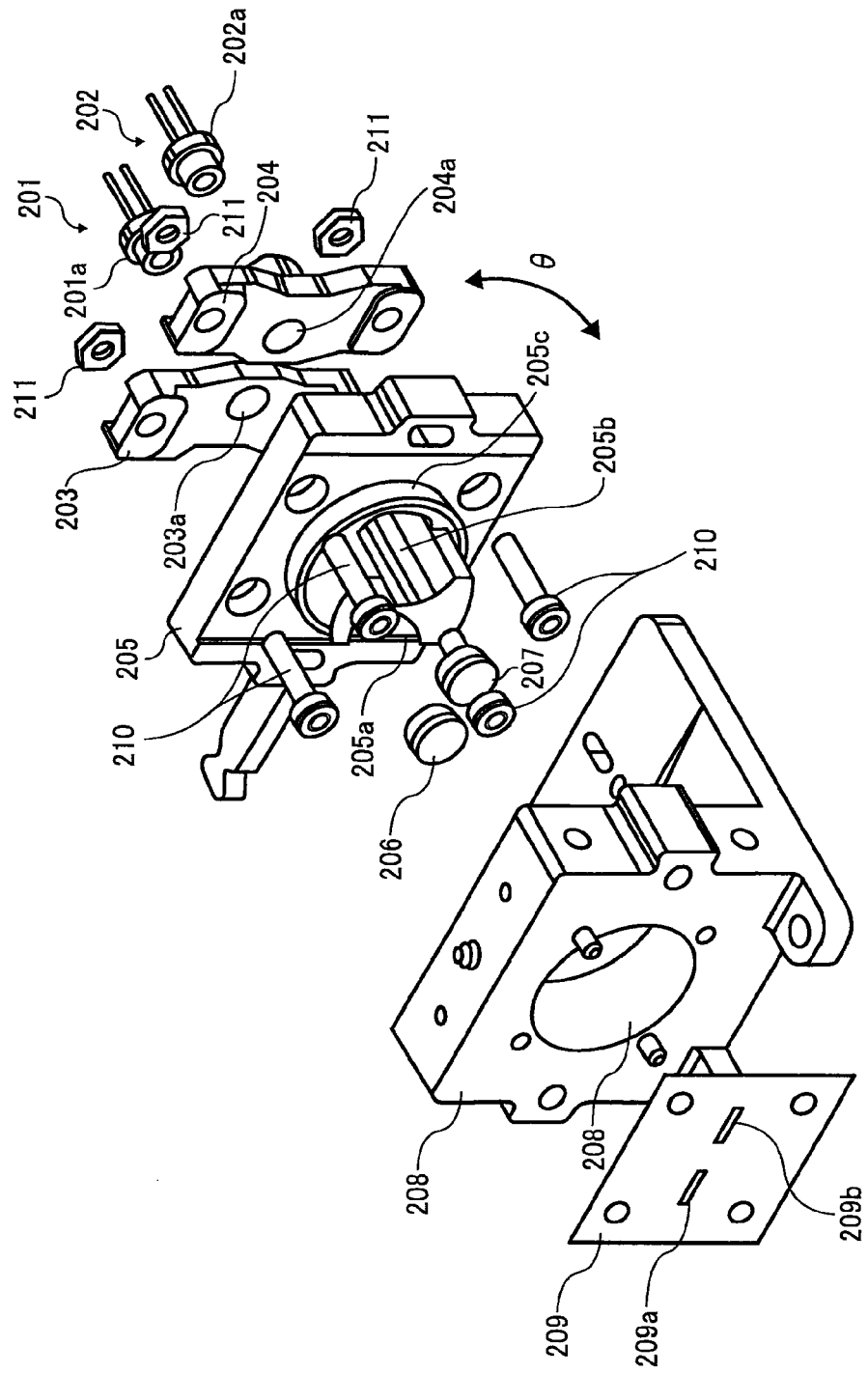
FIG. 16 is a schematic exploded perspective view from the front side of a multi-beam light source device that can be applied to the first and the second embodiments of the present invention.
Figure 17:
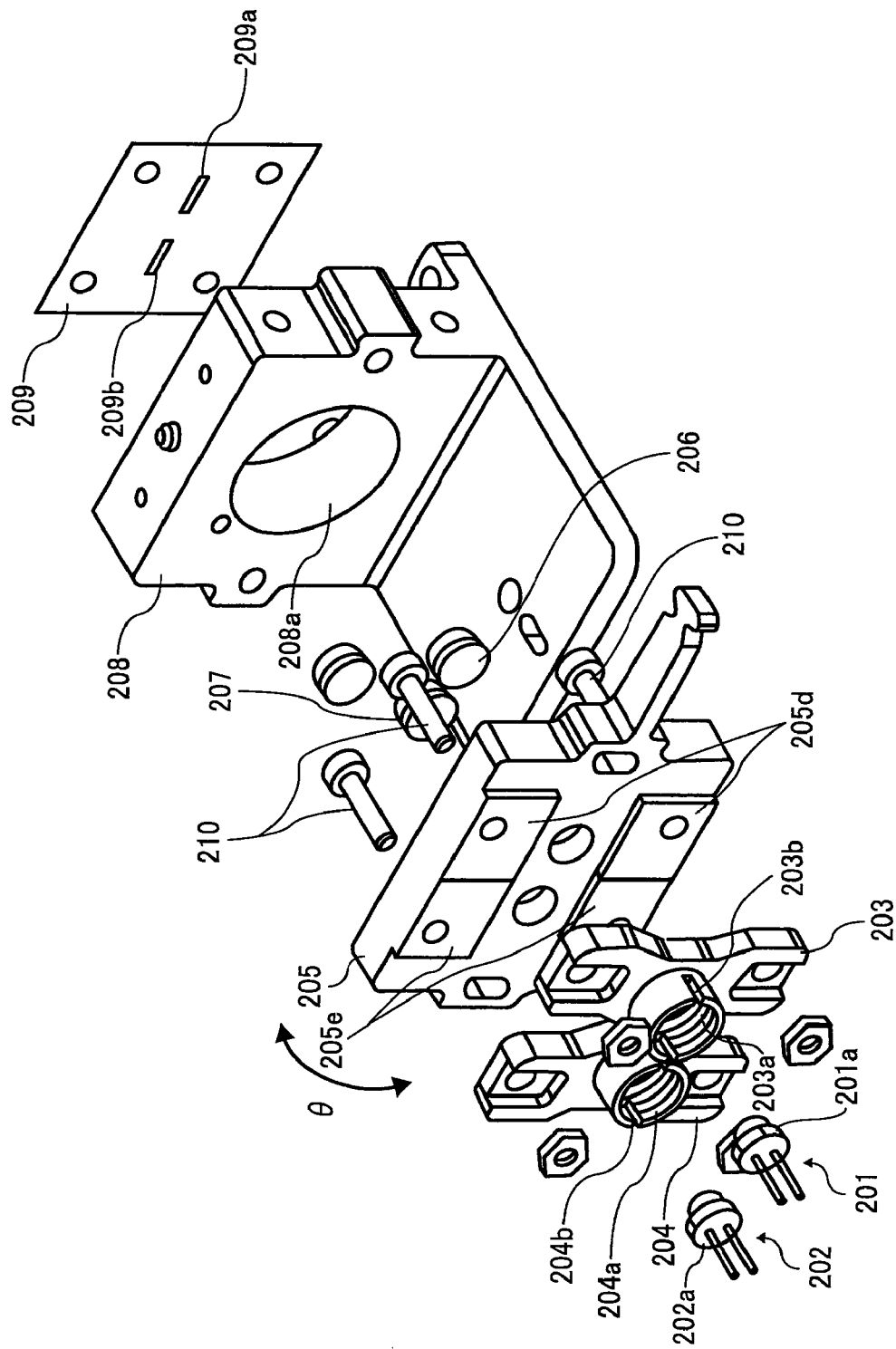
FIG. 17 is a schematic exploded perspective view from the rear side of the multi-beam light source device that can be applied to the first and the second embodiments of the present invention.

FIGS. 16 and 17 are each a drawing of a light source unit that constitutes a multi-beam light source device that can be applied to the first and the second embodiments. In FIGS. 16 and 17, semiconductor lasers 201 and 202 are individually fitted into fitting holes 203a and 204a, respectively, that are formed in base members 203 and 204, respectively. The base members 203 and 204 are fastened onto a holding member 205 by screws 210 and nuts 211. On the rear side of the holding member 205, attachment planes 205d and 205e are formed so that the base members 203 and 204 can be attached thereon. Each of the attachment planes 205d and 205e is formed so as to be slightly inclined at 1 degree in the main-scanning direction. As a result, each of the semiconductor lasers 201 and 202 is also attached so as to be inclined at 1 degree in the main-scanning direction.

Each of the semiconductor lasers 201 and 202 has a notch formed in the corresponding one of heat sink portions 201a and 202b that are each formed in the shape of a circular tube. By having each of the notches engaged with the corresponding one of notches 203b and 204b that are formed in the base members 203 and 204, respectively, it is possible to keep the directions in which the light emitting sources are arranged in alignment. Further, collimate lenses 206 and 207 are configured so that it is possible to adjust the optical axis directions thereof, by having each of the outer circumferences thereof fitted along the corresponding one of attachment guiding planes 205a and 205b that are formed as grooves in the holding member 205. The collimate lenses 206 and 207 are positioned and adhered in such a manner that divergent beams that have been emitted from the light emission points form parallel light fluxes.

By configuring the light source holding member to hold the plurality base members 203 and 204, as the light sources, in such a manner that the base members 203 and 204 are arranged in a row in the sub-scanning direction, it is possible to structure a multi-beam light source device having the plurality of light emission points by using the light source 101. In this structure, another arrangement is acceptable in which each of the semiconductor lasers 201 and 202 that are respectively fitted with the base members 203 and 204 is at an angle in the sub-scanning direction. Alternatively, yet another arrangement is acceptable in which the holding member 205 holds the base members 203 and 204 so that each of the base members 203 and 204 is at an angle in the sub-scanning direction. Further, yet another arrangement is acceptable in which this structure is applied between the base members 203 and 204 and the holding member 205 so that a mechanism that adjusts the angle, in the sub-scanning direction, of each of the base members 203 and 204 is provided, in addition to the holding member 205. Furthermore, yet another arrangement is acceptable in which a semiconductor laser array having a plurality of light emission points is used, instead of the semiconductor lasers 201 and 202. Alternatively, it is also acceptable to configure multi beams with only one semiconductor laser array, instead of the plurality of semiconductor laser arrays.

Figure 18:
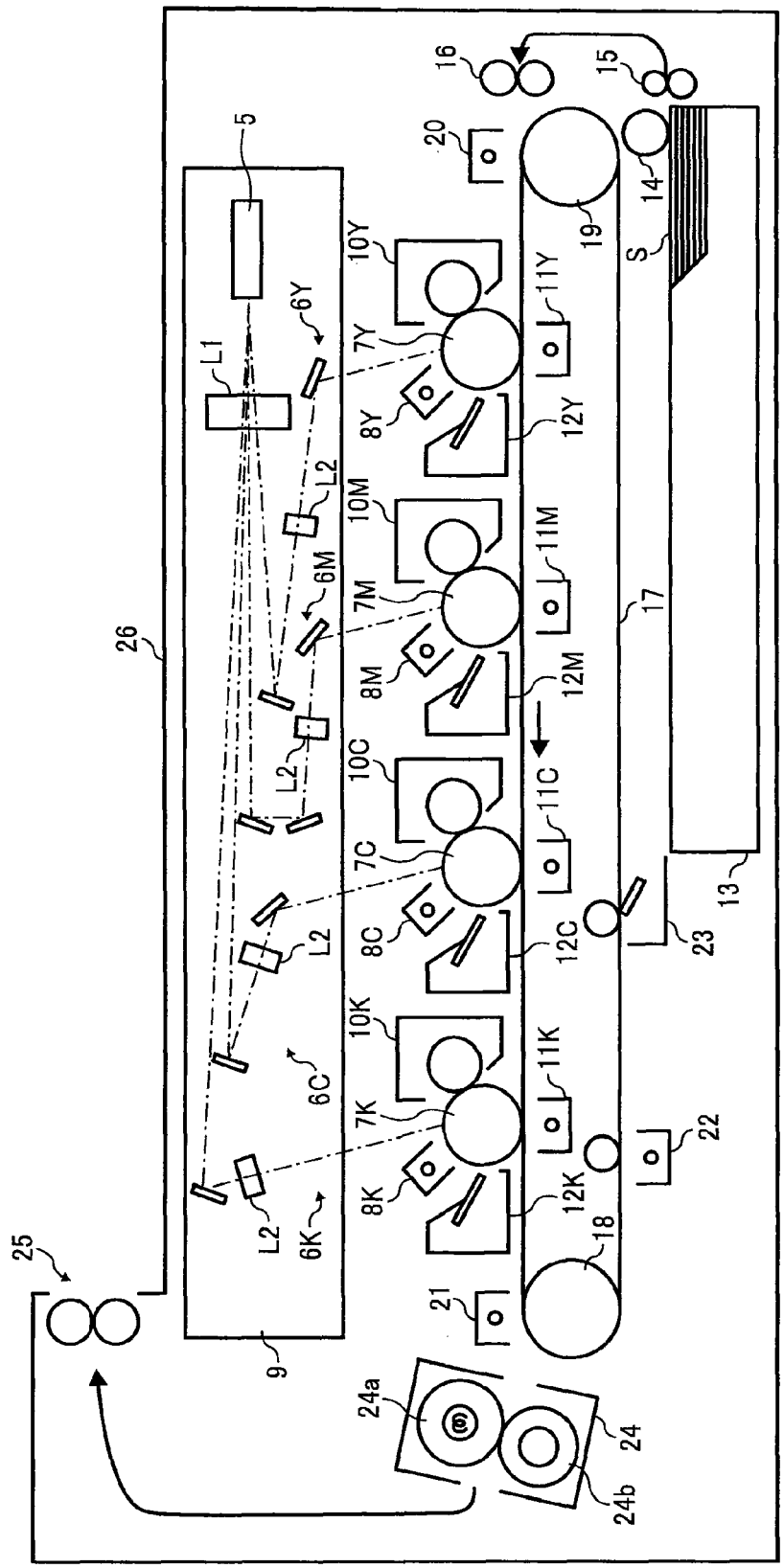
FIG. 18 is a schematic front view of an image forming apparatus to which the optical scanning device according to the present invention can be applied.

FIG. 18 is a drawing of an image forming apparatus to which the optical scanning device described above can be applied. As shown in FIG. 18, provided on the bottom side within a tandem-type full-color laser printer serving as an image forming apparatus is a conveyer belt 17 that carries a printing paper (not shown) supplied from a paper-supplying cassette 13 disposed in a horizontal direction. A photosensitive member 7Y for yellow, a photosensitive member 7M for magenta, a photosensitive member 7C for cyan, and a photosensitive member 7K for black are provided above the conveyer belt 17 at regular intervals, sequentially from the upstream side of the conveyance direction of the transfer paper.

The photosensitive members 7Y, 7M, 7C, and 7K are all configured to have a diameter equal to one another. An electric charger 8, an optical scanning device 6, a developing device 10, a transfer charger 11, a cleaning device 12, and the like that perform processes of an electronic photograph process are provided around each of the photosensitive members 7Y, 7M, 7C, and 7K. In other words, according to the present example, the surface of each of the photosensitive members 7Y, 7M, 7C, and 7K is used as a scanning surface or an irradiated surface that is pre-arranged for the corresponding one of the colors. Optical scanning devices 6Y, 6M, 6C, and 6K are provided for the photosensitive members 7Y, 7M, 7C, and 7K, respectively, in a one-to-one correspondence. It should be noted, however, that a scanning lens L1 is used in common among the optical scanning devices 6Y, 6M, 6C, and 6K.

Also, provided around the conveyer belt 17 are a pair of resist rollers 16 and a belt electric charger 20 that are positioned on the upstream side with respect to the photosensitive member 7Y in terms of the conveyance direction of the transfer paper, as well as a belt separation charger 21, an electricity removing charger 22, a cleaning device 23, and the like that are sequentially positioned on the downstream side with respect to the photosensitive member 7K in terms of the conveyance direction of the transfer paper. Further, provided on the downstream side with respect to the belt separation charger 21 in terms of the conveyance direction of the transfer paper is a fixation device 24, so that the transfer paper that has passed through the fixation device 24 is ejected onto a paper ejecting tray 26 by a paper ejecting roller 25.

In the configuration described above, for example, when the image forming apparatus is in a full-color mode (i.e., a mode with a plurality of colors), the light beams are emitted from the optical scanning devices 6Y, 6M, 6C, and 6K onto the photosensitive members 7Y, 7M, 7C, and 7K, respectively, based on image signals corresponding to the different colors, so that electrostatic latent images corresponding to the color signals are formed on the surfaces of the photosensitive members 7Y, 7M, 7C, and 7K, respectively. Each of the electrostatic latent images that have been formed is developed into a toner image by the corresponding one of developing devices 10Y, 10M, 10C, and 10K, by using a toner of the corresponding color. The toner images are sequentially transferred onto the transfer paper that is electrostatically adhered to the conveyer belt 17 and carried over, so as to be overlapped on top of one another. Consequently, a full-color image is formed on the transfer paper. The full-color image that has been formed is fixed on the transfer paper by the fixation device 24, and the transfer paper on which the image has been fixed is ejected onto the paper ejecting tray 26 by the paper ejecting roller 25.

By using the optical scanning device described above as each of the optical scanning devices 6Y, 6M, 6C, and 6K that are included in the image forming apparatus above, it is possible to reduce the changes in the angle, in the sub-scanning direction, of the light beams that are caused by the influence of assembly errors, process errors, or the like, so as to reduce bending of the scanning lines and to alleviate degradation of the wave aberration in the optical scanning devices that use the oblique incident method that is optimal for reducing the costs, lowering the electric power consumption, and making the devices compact. Consequently, it is possible to provide an image forming apparatus that is able to achieve good and stable quality of images.

Embodiments have been described above by taking a full-color laser printer as an example of an image forming apparatus. However, the image forming apparatuses to which the present invention can be applied are not limited to the full-color laser printer. It is possible to apply the present invention to other image forming apparatuses such as copying machines, facsimiles, plotters, and multifunction products in which the functions of two or more of these apparatuses are combined together.

According to an aspect of the present invention, converging lenses are fixed, via corresponding supporting members, in appropriate positions that yield desired light flux. Therefore, it is possible to achieve a plurality of optical characteristics at the same time, such as the characteristics to prevent the beam waist diameter from becoming large, to reduce the deviation of the position of the beam waist, and to reduce the deviation of the position of the beam spot. In addition, the converging lenses are configured so that it is possible to adjust the eccentricity thereof in a direction to go around an axial line that is parallel to the optical axis. As a result, it is possible to optimize the distance between the scanning lines in the sub-scanning direction (i.e., the sub-scanning beam pitch).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a plurality of converging lenses that converge, at least in a sub-scanning direction, a plurality of light beams that have been emitted from a plurality of light sources so as to be substantially parallel to one another;
    a plurality of supporting members, each of the supporting members supports a corresponding one of the converging lenses for each light beam;
    an optical deflector that deflects the light beams in a main-scanning direction; and
    a housing that supports the supporting members, the optical scanning device being configured so as to cause the light beams that are positioned apart from one another in the sub-scanning direction to be incident onto the optical deflector,
    wherein the converging lenses are arranged in a row in the sub-scanning direction and are arranged so as to be out of alignment with one another in the main-scanning direction in such a manner that no converging lens interferes with supporting members that support other converging lenses, and each of the converging lenses is fixed onto the corresponding one of the supporting members in a fixing position capable of being adjusted, and the converging lenses are configured so that it is possible to adjust the eccentricity thereof in a direction to go around an axial line that is parallel to an optical axis direction;

wherein the converging lenses are configured so that it is possible to adjust the fixing positions of each of the supporting members individually in the optical axis direction for each of the converging lenses with respect to the housing without the converging lenses interfering with the supporting members; and wherein the converging lenses are fixed to the respective support members, at end portions of the support members, and wherein the end portions are located at respective different sides with respect to the main-scanning direction.

2. The optical scanning device according to claim 1, wherein, after performing adjustment of orientations of the converging lenses, the converging lenses are firmly fixed to the supporting members by using a light-curing adhesive.

3. The optical scanning device according to claim 1, wherein the supporting members are firmly fixed to the housing by using a light-curing adhesive.

4. The optical scanning device according to claim 3, wherein each of the supporting members is made of a material that has optical transparency.

5. The optical scanning device according to claim 1, wherein the light beams are incident onto the optical deflector at a predetermined angle in the sub-scanning direction, and the housing has one or more inclined supporting surfaces for supporting the supporting members with an angle of inclination corresponding to the predetermined angle.

6. The optical scanning device according to claim 1, wherein the optical scanning device performs an optical scanning process by using a plurality of sets of light beams, each of the sets being made up of a plurality of light beams that are substantially parallel to one another.

7. An image forming apparatus comprising:
an optical scanning device including
a plurality of converging lenses that converge, at least in a sub-scanning direction, a plurality of light beams that have been emitted from a plurality of light sources so as to be substantially parallel to one another;
a plurality of supporting members, each of the supporting members supports a corresponding one of the converging lenses for each light beam;
an optical deflector that deflects the light beams in a main-scanning direction; and
a housing that supports the supporting members, the optical scanning device being configured so as to cause the light beams that are positioned apart from one another in the sub-scanning direction to be incident onto the optical deflector, wherein the converging lenses are arranged in a row in the sub-scanning direction and are arranged so as to be out of alignment with one another in the main-scanning in such a manner that no converging lens interferes with supporting members that support other converging lenses, and each of the converging lenses is fixed onto the corresponding one of the supporting members in a fixing position capable of being adjusted, and the converging lenses are configured so that it is possible to adjust the eccentricity thereof in a direction to go around an axial line that is parallel to an optical axis direction; and a plurality of photosensitive members that receive the light beams deflected from the optical deflector;

wherein the converging lenses are configured so that it is possible to adjust the fixing positions of each of the supporting members individually in the optical axis direction for each of the converging lenses with respect to the housing without the converging lenses interfering with the supporting members; and wherein the converging lenses are fixed to the respective support members, at end portions of the support members, and wherein the end portions are located at respective different sides with respect to the main-scanning direction.

* * * * *